United States Patent
Safari Zadeh et al.

(10) Patent No.: US 8,853,897 B2
(45) Date of Patent: Oct. 7, 2014

(54) COOLING SYSTEM FOR THE BUSHINGS OF AN ELECTRIC GENERATOR AND METHOD FOR COOLING THE BUSHINGS OF AN ELECTRIC GENERATOR

(75) Inventors: Hossein Safari Zadeh, Othmarsingen (CH); Damir Novosel, Oberentfelden (CH); Jesus Contreras-Espada, Linz (AT)

(73) Assignee: Alstom Technology Ltd, Baden (CH)

( * ) Notice: Subject to any disclaimer, the term of this patent is extended or adjusted under 35 U.S.C. 154(b) by 43 days.

(21) Appl. No.: 13/462,606

(22) Filed: May 2, 2012

(65) Prior Publication Data

US 2012/0267980 A1    Oct. 25, 2012

Related U.S. Application Data

(63) Continuation of application No. PCT/EP2010/066461, filed on Oct. 29, 2010.

(30) Foreign Application Priority Data

Nov. 3, 2009 (EP) .................................... 09174912

(51) Int. Cl.
*H02K 9/28* (2006.01)
*H02K 3/50* (2006.01)
*H02K 5/22* (2006.01)

(52) U.S. Cl.
CPC .............. *H02K 3/50* (2013.01); *H02K 2203/09* (2013.01); *H02K 5/225* (2013.01); *H05K 9/06* (2013.01)

USPC ............................................... 310/58; 310/63

(58) Field of Classification Search
USPC ........ 310/52, 28, 59, 60 R, 63, 143, 219, 227
See application file for complete search history.

(56) References Cited

U.S. PATENT DOCUMENTS

| 4,246,503 A * | 1/1981 | Fujioka et al. ................... 310/59 |
| 4,334,159 A * | 6/1982 | Ooki et al. ........................ 310/54 |
| 4,410,821 A * | 10/1983 | Kurt ............................... 310/227 |
| 4,599,169 A * | 7/1986 | Ray ................................ 210/175 |
| H000410 H * | 1/1988 | Berry et al. ...................... 310/11 |
| 2002/0070623 A1* | 6/2002 | Rehder et al. .................. 310/232 |

FOREIGN PATENT DOCUMENTS

| DE | 1089058 B | 9/1960 |
| EP | 2001095 A2 | 12/2008 |
| GB | 771770 A | 4/1957 |

* cited by examiner

*Primary Examiner* — Tran Nguyen
(74) *Attorney, Agent, or Firm* — Buchanan Ingersoll & Rooney PC

(57) ABSTRACT

A cooling system for bushings of an electric generator, which includes a casing housing a stator and a rotor connected to a rotor shaft activating at least a fan defining at least a high pressure zone and a low pressure zone. The generator has a plurality of phases electrically connected to hollow phase rings that are electrically connected to bushings supported by the casing and having cooling circuits to let a cooling medium pass through them to cool them. The outlets of the bushing cooling circuits are housed in the high pressure zone and are connected to inlets of the hollow phase rings. A method for cooling the bushings of an electric generator is also provided.

18 Claims, 4 Drawing Sheets

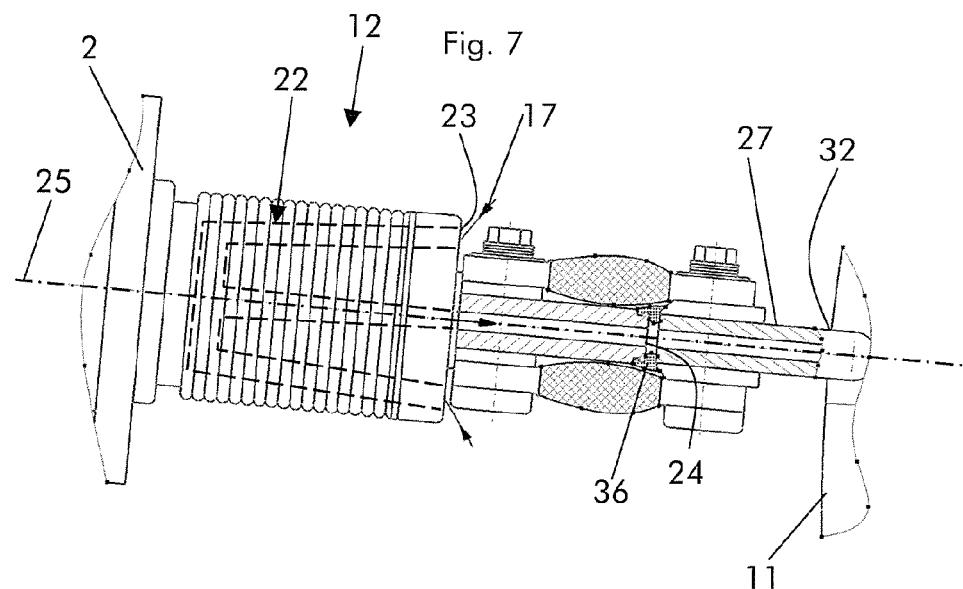
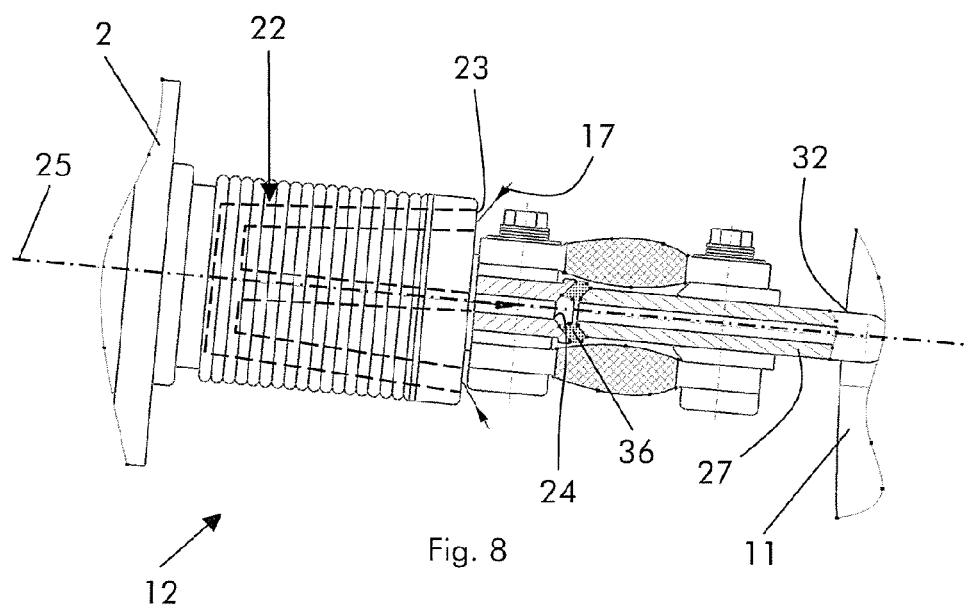

US 8,853,897 B2

COOLING SYSTEM FOR THE BUSHINGS OF AN ELECTRIC GENERATOR AND METHOD FOR COOLING THE BUSHINGS OF AN ELECTRIC GENERATOR

CROSS REFERENCE TO RELATED APPLICATIONS

This application is a continuation of PCT/EP2010/066461, filed Oct. 29, 2010 which claims priority of European Patent Application No. 09174912.7, filed Nov. 3, 2009, the entire contents of all of which are incorporated by reference as if fully set forth.

FIELD OF INVENTION

The present invention relates to a cooling system for the bushings of an electric generator and a method for cooling the bushings of an electric generator.

BACKGROUND

With reference to FIG. 1, generators 1 have a casing 2 enclosing a stator 3 and a rotor 4 supported by a rotor shaft 5.

The rotor shaft 5 carries a fan 6 that, together with a fixed wall 7, having a hole in which the rotor shaft 5 is housed, defines a low pressure zone 8 (inside of the casing or being the outer environment) and a high pressure zone 9.

The stator 3 defines a plurality of stator phases each electrically connected to a phase ring 11 (FIG. 1 shows a traditional generator with three phase rings).

The phase rings 11 are electrically connected to bushings 12 through which the electric power generated by the generator 1 is transferred outside of the casing 2.

During operation the phase rings 11 and bushings 12 convey very high currents and thus must be cooled.

For this reason, the bushings 12 have an inner cooling circuit with an inlet that opens in the high pressure zone 9 to let a cooling medium 17 contained therein (for example the gas contained inside of the casing 2) enter, and an outlet that opens outside of the casing 2 and is connected to Teflon® pipes 14 that are connected to the low pressure zone 8 to discharge the cooling medium after it has cooled the bushings 12.

The phase rings 11 are hollow shaped with inlets that let the cooling medium contained inside of the high pressure zone 9 enter and pass through to cool them.

This traditional cooling system proved to be quite efficient, nevertheless new generators have been developing in which a plurality of phases (more then three) is connected to bushings (typically each phase is connected to two bushings).

It is clear that with these new generators it is very difficult and, for a very large number of phases (such as for example 15 or more phases), it could be practically impossible to implement a traditional cooling system.

In fact, since an increase of the number of phases also causes the number of bushings (being twice the number of phases) to be increased, no space may be available for the pipes 14.

SUMMARY

The present disclosure is directed to a cooling system for bushings of an electric generator, which includes a casing housing a stator and a rotor connected to a rotor shaft activating at least a fan defining at least a high pressure zone and a low pressure zone. The generator having a plurality of phases electrically connected to hollow phase rings that are electrically connected to bushings supported by the casing and having cooling circuits to allow a cooling medium to pass through them to cool them. Outlets of the bushing cooling circuits are housed in the high pressure zone and are connected to inlets of the hollow phase rings.

The present disclosure is also directed to a method for cooling bushings of an electric generator, which includes a casing housing a stator and a rotor connected to a rotor shaft activating at least a fan defining at least a high pressure zone and a low pressure zone. The generator having a plurality of phases electrically connected to hollow phase rings that are electrically connected to bushings supported by the casing and having cooling circuits to allow a cooling medium to pass through them to cool them. The method includes discharging the cooling medium circulating in the bushing cooling circuits from the bushing cooling circuit via outlets that are housed in the high pressure zone; and feeding the cooling medium into the hollow phase rings via inlets to cool them.

BRIEF DESCRIPTION OF THE DRAWINGS

Further characteristics and advantages of the invention will be more apparent from the description of a preferred but non-exclusive embodiment of the cooling system according to the invention, illustrated by way of non-limiting example in the accompanying drawings, in which:

FIGS. 7 and 8 show two bushings that can be used to implement the invention.

DETAILED DESCRIPTION OF THE PREFERRED EMBODIMENTS

Introduction to the Embodiments

The technical aim of the present invention is therefore to provide a cooling system for the bushings of an electric generator and a method by which the said problems of the known art are eliminated.

Within the scope of this technical aim, an aspect of the invention is to provide a cooling system for the bushings (and preferably also the phase rings of an electric generator) that is compact, in particular when compared to traditional cooling systems.

A further aspect of the invention is to provide a cooling system and a method that can be easily implemented also in generators having more than three (3) phases, such as fifteen (15) phases or even more phases; it should be nonetheless clear that the cooling system of the invention can also be advantageously applied in generators with a limited number of phases, such as three phases.

The technical aim, together with these and further aspects, are attained according to the invention by providing a cooling system and a method in accordance with the accompanying claims.

Advantageously, with the cooling system of the invention each bushing, that is in series design with a phase ring, is fed with a cooling medium having the same temperature of the cooling medium fed to the other bushings; this lets the bushings be efficiently cooled and their operating temperature be uniform.

Moreover, since the bushing operating temperature is the same, the lifetime and the reliability of the bushings (that largely depends on their operating temperature) are very high.

In addition, the cooling system according to the invention also provides a very high compactness.

DETAILED DESCRIPTION

Figure 1:
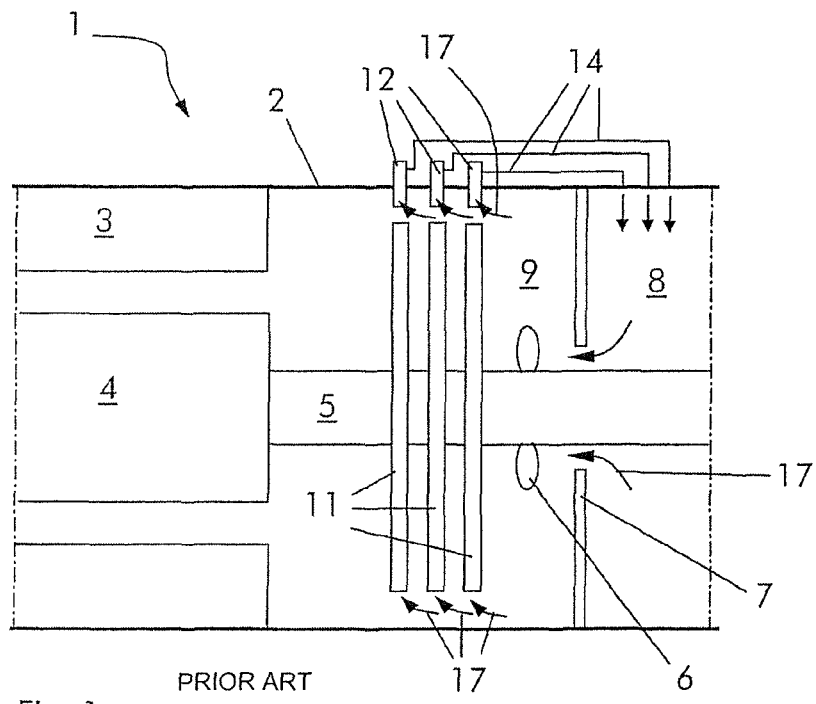
FIG. 1 is a schematic view of a portion of a traditional generator.

With reference to the figures, which show a portion of a generator similar to that already described with reference to FIG. 1; for this reason like reference numbers indicate like elements.

In particular, the generator 1 has a casing 2 that houses a stator 3 and a rotor 4 connected to a rotor shaft 5 that carries a fan 6 defining (in the embodiment shown together with the wall 7), two zones having different operating pressures and being a low pressure zone 8 and a high pressure zone 9 wherein the stator 3 and the rotor 4 are housed.

Typically the stator 3 has stator bars 20 connected each other to define a three phase generator or only groups of stator bars are connected each other such that generators having more than three phases may be manufactured; it is also clear that each stator bar 20 may define a phase of the generator.

In addition, in further different embodiments of generators the phases may be defined by bars carried by the rotor (but these embodiments are quite rare).

The cooling system according to the invention may be implemented on generators independently of the particular generator type, phase number and phase bar location.

Figure 2:
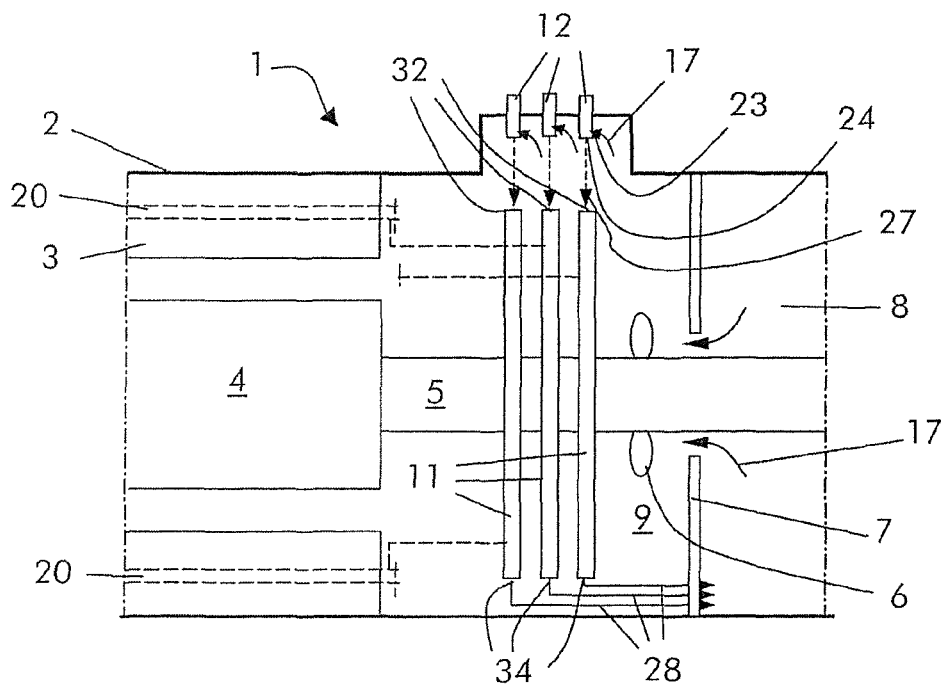
FIG. 2 is a schematic view of a portion of a generator having a cooling system of an embodiment of the invention.

The generator phases are electrically connected to hollow phase rings 11; thus, with reference to FIG. 2, the three stator bar groups defining three generator phases are connected to three phase rings 11.

The phase rings 11 are electrically connected to bushings 12 that are supported by the generator casing 2 and are arranged to connect the generator phases to further components outside of the generator casing 2.

Usually, each phase ring 11 is connected to two bushings 12.

Each bushing 12 has a cooling circuit 22, wherein a cooling medium 17 circulates, having outlets 24 housed in the high pressure zone 9 and connected to inlets 32 of the hollow phase rings 11.

The bushings 12 have inlets 23 for the entrance of the cooling medium that are contained inside of the high pressure zone 9.

In actual generators this cooling medium 17 is usually air or H2, it is anyhow clear that also different gases or fluids such as water (with the necessary supply circuit) can be used according the particular needs.

The cooling medium 17 is directly provided from a cooling medium source that is preferably defined by the high pressure zone 9.

As is particularly shown in FIGS. 7 and 8 the bushing cooling circuit inlets 23 are laterally located on the bushings 12, and bushing cooling circuit outlets 24 are located along a longitudinal symmetry axis 25 of the bushings 12.

In addition, first pipes 27 connecting the bushing cooling circuit outlets 24 to the inlets 32 of the hollow phase rings 11 are provided.

Also second pipes 28 connecting the phase rings outlets 34 to the low pressure zone 8 are provided.

Since each phase rings 11 is connected to only one second pipes 28, the total number of these second pipes 28 is half the number of the pipes 14 necessary in traditional cooling systems.

Moreover, the second pipes 28 may be located inside of the casing 2 (as shown in the enclosed figures) or, in different embodiments, they may be located partially outside of the casing 2 or only some of them may be located partially outside of the casing 2.

Figure 3:
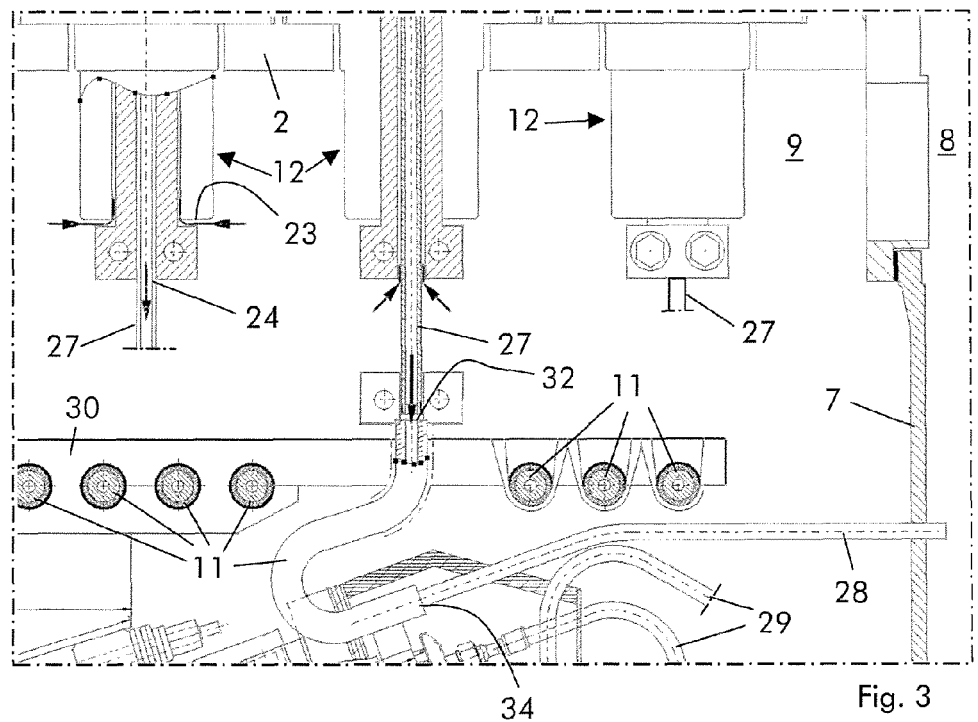
FIG. 3 is a particular of an embodiment of the invention.

FIG. 2 shows a three phase generator and the embodiment of FIG. 3 shows a generator having more then three phases. Moreover, FIG. 3 also shows pipes 29 for supplying water to the stator and a number of phase rings 11 (more then three because the generator of FIG. 3 has more then three phases) supported by a wall 30 made of an insulating material such as plastic.

FIGS. 7 and 8 show two embodiments of bushings 12.

In the embodiment of FIG. 7 the first pipes 27 are fixed to the bushings 12 and removably connected to the phase ring inlets 32.

As shown, the first pipes 27 are housed in through seats at an end portion of each bushing 12 and a seal 36 is provided between the first pipes 27 and the bushing cooling circuit outlet 24.

FIG. 8 shows a different embodiment with the first pipes 27 fixed to the hollow phase rings 11 and removably connected to bushing cooling circuit outlet 24.

In this case the first pipes 27 are also housed in through seats at an end portion of the bushings 12, preferably with their terminal portion in an enlarged zone of the bushings 12; moreover a seal 36 is provided between the first pipes 27 and the bushing cooling circuit outlet 24. This lets possible manufacturing, assembly misalignment and thermal extension to be compensated and the mechanical oscillations be de-coupled.

Advantageously, the first pipes 27 define a bayonet connection to the phase ring inlet 32 or to the bushing cooling circuit outlet 24, such that the bushings 12 can be connected to the casing 2 and at the same time to the phase rings 11 without the need of separated first pipes.

Figure 5:
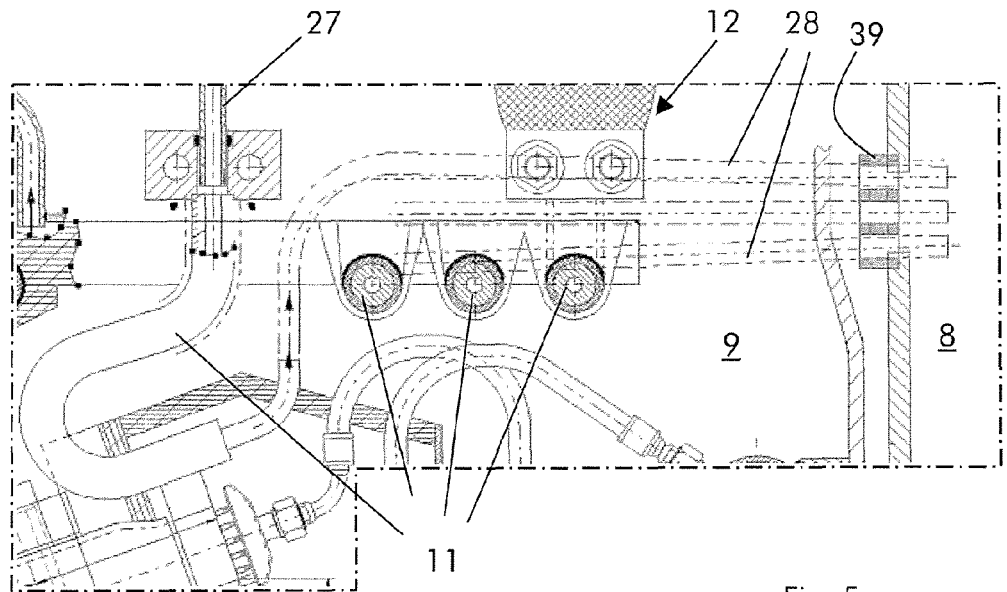
FIGS. 5 and 6 show a further embodiment with a plate carrying the pipes from the phase rings.
Figure 6:
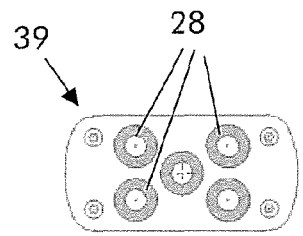

FIGS. 5 and 6 show an embodiment of the invention particularly advantageous for connecting a plurality of second pipes 28 directly to the low pressure zone 8.

In FIG. 5 a plurality of second pipes 28 are connected to at least a plate 39 that may be connected to the generator casing 2 or to the wall 7 cooperating with the fan 6 to define the high pressure zone 9 and the low pressure zone 8; FIG. 6 shows a front view of the plate 39.

Figure 4:
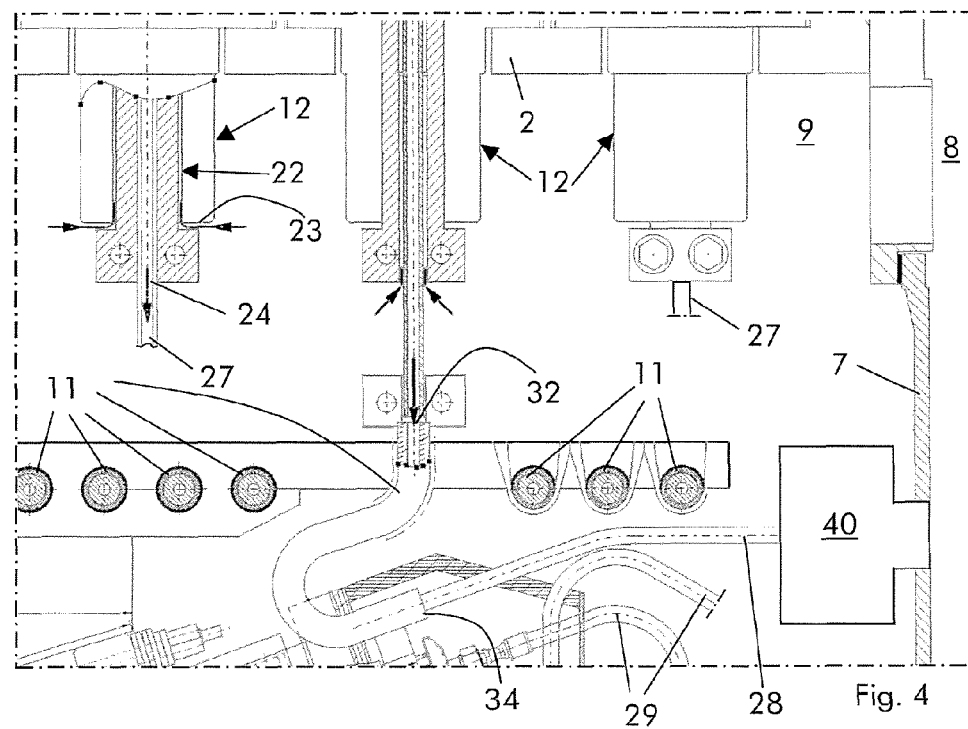
FIG. 4 is a further embodiment with pipes for discharging the cooling medium from the phase rings connected to a manifold.

FIG. 4 shows a further embodiment in which the casing 2 houses at least a manifold 40 to which a plurality of second pipes 28 is connected.

The manifold 40 collets the cooling medium 17 coming from the phase ring outlets 34 and feeds it into the low pressure zone 8.

The operation of the cooling system is apparent from what described and illustrated and is substantially the following.

With reference to FIG. 2 or 3, the cooling medium contained inside of the high pressure zone 9 enters the bushing cooling circuit 22 via the inlets 23 that are located inside of the high pressure zone 9.

Thus, the cooling medium passes through the bushing cooling circuits 22 cooling the bushings 12 and reaches the bushing cooling circuit outlets 24, from where it enters the first pipes 27 and then, via the phase rings inlets 32, it enters the hollow phase rings 11.

Thus, the cooling medium 17 passes through the phase rings 11 cooling them and, when it reaches the phase rings outlet 34, it enters the second pipes 28 that convey it into the low pressure zone 8.

Thus the differential pressure between the high pressure zone 9 (where the bushing cooling circuit inlets 23 are located) and the low pressure zone 8 (where the outlets of the second pipes 28 are located) allows cooling medium circulation.

In addition, cooling medium enters the bushing cooling circuit 22 directly from the source where it is stored (being the high pressure zone 9); therefore the cooling medium temperature is the lowest possible, because it has not cooled other components before cooling the bushings.

This feature could be important, because typically bushings are more temperature sensitive and expensive than phase rings (that are cooled with cooling medium coming from the bushing cooling circuits 22).

The present invention also relates to a method for cooling the bushings 12 of an electric generator 1.

In the method, the cooling medium 17 is made to circulate in the bushing cooling circuits 22 and discharged from the bushing cooling circuit 22 via outlets 24 that are housed in the high pressure zone 9, and then feeding it into the hollow phase rings 11 via inlets 32 to cool them.

Naturally, the features described may be independently provided from one another.

In practice the materials used and the dimensions can be chosen at will according to requirements and to the state of the art.

REFERENCE NUMBERS 1 generator
2 casing
3 stator
4 rotor
5 rotor shaft
6 fan
7 wall
8 low pressure zone
9 high pressure zone
11 phase rings
12 bushings
14 pipes
17 cooling medium
20 stator bars
22 cooling circuit of 12
23 inlet of 22
24 outlet of 22
25 symmetry axis of 12
27 first pipes
28 second pipes
29 pipes for supplying water to the stator
30 wall for supporting the phase rings
32 inlet of 11
34 outlet of 11
36 seal
39 plate
40 manifold

What is claimed is:

1. An electric generator, the generator comprising:
a cooling system for bushings thereof, and a casing for housing a stator and a rotor connected to a rotor shaft activating at least a fan defining at least a high pressure zone and a low pressure zone both divided by a wall,
said generator further comprising a plurality of phases electrically connected to hollow phase rings that are electrically connected to bushings supported by the casing,
said cooling system including cooling circuits to let a cooling medium to pass through said hollow phase rings to cool them, outlets of the bushing cooling circuits are housed in the high pressure zone and are connected to inlets of the hollow phase rings, wherein the bushing cooling circuits have inlets for the entrance of the cooling medium that are contained inside of the high pressure zone; and
first pipes connecting the bushing cooling circuit outlets to the inlets of the hollow phase rings.

2. The generator as claimed in claim 1, wherein the cooling medium is directly provided from a cooling medium source.

3. The generator as claimed in claim 2, wherein said cooling medium source is defined by the high pressure zone.

4. The generator as claimed in claim 3, wherein said bushing cooling circuit inlets are laterally located on said bushings, and said bushing cooling circuit outlets are located along a longitudinal symmetry axis of the bushings.

5. The generator as claimed in claim 1, comprising:
second pipes between phase ring outlets and the low pressure zone.

6. The generator as claimed in claim 5, wherein said first pipes are fixed to the bushings and removably connectable to the phase ring inlets or said first pipes are fixed to the hollow phase rings and removably connectable to the bushing cooling circuit outlet.

7. The generator as claimed in claim 6, wherein said first pipes are housed in through seats at an end portion of each bushing, at least a seal being provided between the first pipes and the bushing cooling circuit outlet.

8. The generator as claimed in claim 7, wherein said first pipes define a bayonet connection into said phase ring inlet or bushing cooling circuit outlet.

9. The generator as claimed in claim 5, wherein a plurality of said second pipes are connected to at least a plate that is connected to the generator casing or to a wall cooperating with the fan to define the high pressure zone and the low pressure zone.

10. The generator as claimed in claim 5, wherein said casing houses at least a manifold to which a plurality of second pipes are connected, and wherein said manifold collets the cooling medium coming from the phase ring outlets and feeds it into the low pressure zone.

11. An electric generator, the generator comprising:
a cooling system for bushings of the electric generator;
a casing for housing a stator and a rotor connected to a rotor shaft configured to activate at least a fan defining at least a high pressure zone and a low pressure zone;
a plurality of phases electrically connected to hollow phase rings that are electrically connected to bushings supported by the casing and said cooling system including cooling circuits to let a cooling medium to pass through said phase ring to cool them, outlets of the bushing cooling circuits are housed in the high pressure zone and are connected to inlets of the hollow phase rings;
wherein the bushing cooling circuits have inlets for the entrance of the cooling medium that are contained inside of the high pressure zone, and wherein said bushing cooling circuit inlets are laterally located on said bushings and said bushing cooling circuit outlets are located along a longitudinal symmetry axis of the bushings; and wherein the cooling medium is directly provided from a cooling medium source, and wherein said cooling medium source is defined by the high pressure zone.

12. The generator as claimed in claim 11, further comprising:
first pipes connecting the bushing cooling circuit outlets to the inlets of the hollow phase rings.

13. The generator as claimed in claim 12, comprising:
second pipes between phase ring outlets and the low pressure zone.

14. The generator as claimed in claim 13, wherein said first pipes are fixed to the bushings and removably connectable to the phase ring inlets or said first pipes are fixed to the hollow phase rings and removably connectable to the bushing cooling circuit outlet.

15. The generator as claimed in claim 14, wherein said first pipes are housed in through seats at an end portion of each bushing, at least a seal being provided between the first pipes and the bushing cooling circuit outlet.

16. The generator as claimed in claim 15, wherein said first pipes define a bayonet connection into said phase ring inlet or bushing cooling circuit outlet.

17. The generator as claimed in claim 13, wherein a plurality of said second pipes are connected to at least a plate that is connected to the generator casing or to a wall cooperating with the fan to define the high pressure zone and the low pressure zone.

18. The generator as claimed in claim 13, wherein said casing houses at least a manifold to which a plurality of second pipes are connected, and wherein said manifold collets the cooling medium coming from the phase ring outlets and feeds it into the low pressure zone.

\* \* \* \* \*